United States Patent
Cao

(10) Patent No.: US 10,889,525 B2
(45) Date of Patent: Jan. 12, 2021

(54) SOUND ABSORPTION MATERIAL PREPARATION METHOD, SOUND ABSORPTION MATERIAL AND FILLING METHOD THEREOF

(71) Applicant: Goertek Inc., Shandong (CN)

(72) Inventor: Xiaodong Cao, Shandong (CN)

(73) Assignee: Goertek Inc., Shandong (CN)

( * ) Notice: Subject to any disclaimer, the term of this patent is extended or adjusted under 35 U.S.C. 154(b) by 452 days.

(21) Appl. No.: 15/757,814

(22) PCT Filed: Nov. 19, 2015

(86) PCT No.: PCT/CN2015/095003
§ 371 (c)(1),
(2) Date: Mar. 6, 2018

(87) PCT Pub. No.: WO2017/035956
PCT Pub. Date: Mar. 9, 2017

(65) Prior Publication Data
US 2018/0354862 A1    Dec. 13, 2018

(30) Foreign Application Priority Data
Sep. 6, 2015   (CN) .......................... 2015 1 0560859

(51) Int. Cl.
*C04B 38/06*  (2006.01)
*H04R 1/28*  (2006.01)
*G10K 11/162*  (2006.01)
*G10K 11/172*  (2006.01)
*H04R 31/00*  (2006.01)
(Continued)

(52) U.S. Cl.
CPC ...... *C04B 38/0655* (2013.01); *C04B 38/0615* (2013.01); *G10K 11/162* (2013.01);
(Continued)

(58) Field of Classification Search
CPC ............ C04B 38/0655; C04B 38/0615; C04B 2111/52; G10K 11/162; G10K 11/172;
(Continued)

(56) References Cited

U.S. PATENT DOCUMENTS

2003/0183799 A1* 10/2003 Oishi ..................... F02K 1/827
252/62
2016/0111076 A1    4/2016 Qian et al.

FOREIGN PATENT DOCUMENTS

| CN | 101333608 A | 12/2008 |
|---|---|---|
| CN | 104108902 A | 10/2014 |

(Continued)

OTHER PUBLICATIONS

International Searching Authority, International Search Report (ISR) and Written Opinion for International Application No. PCT/CN2015/095003, dated Jun. 12, 2016, 9 pages, State Intellectual Property Office of the P.R.C., China.

*Primary Examiner* — Forrest M Phillips
(74) *Attorney, Agent, or Firm* — Alston & Bird LLP

(57) ABSTRACT

A sound absorption material preparation method, a sound absorption material and a filling method thereof. The preparation method comprises: S1, preparing a non-foaming material slurry; S2, producing a combustible material framework and a cover-shape container, and placing the combustible material framework into the cover-shape container; S3, forming the non-foamed material slurry in the cover-shape container to form a wet formed body; S4, drying the wet formed body to form a dry formed body; and S5, calcining the dry formed body, wherein the combustible material framework is burned off during the calcining step to form connected channels with a three-dimensional structure in the sound absorption material. The preparation method is simple in operation. Connected channels with a three-dimensional structure are formed in the sound absorption material so that (Continued)

the sound absorption effect is improved. The sound absorption material is prepared by the preparation method, has connected channels with a three-dimensional structure therein, and has a good sound absorption effect. The filling method comprises first pre-forming the sound absorption material and then filling same into a space to be filled, so that the sound absorption material fully fills the space to be filled.

9 Claims, 3 Drawing Sheets

(51) Int. Cl.
    *C04B 111/52*    (2006.01)
    *H04R 9/06*    (2006.01)
(52) U.S. Cl.
    CPC ......... *G10K 11/172* (2013.01); *H04R 1/2803* (2013.01); *H04R 31/00* (2013.01); *C04B 2111/52* (2013.01); *H04R 1/2888* (2013.01); *H04R 9/06* (2013.01)

(58) Field of Classification Search
    CPC .... H04R 1/2803; H04R 31/00; H04R 1/2888; H04R 9/06
    See application file for complete search history.

(56) References Cited

FOREIGN PATENT DOCUMENTS

| | | | | |
|---|---|---|---|---|
| CN | 104202703 A | 12/2014 | | |
| CN | 104446132 A | 3/2015 | | |
| EP | 2845646 A2 * | 3/2015 | ......... | B01D 53/9418 |
| JP | H04104974 A | 4/1992 | | |
| WO | WO-2012137655 A1 * | 10/2012 | ......... | C04B 38/0006 |
| WO | WO 2016/026211 A1 | 2/2016 | | |
| WO | WO 2016/034013 A1 | 3/2016 | | |
| WO | WO-2016039328 A1 * | 3/2016 | ......... | C04B 38/0006 |
| WO | WO-2017050768 A1 * | 3/2017 | ......... | C04B 20/1055 |

\* cited by examiner

SOUND ABSORPTION MATERIAL PREPARATION METHOD, SOUND ABSORPTION MATERIAL AND FILLING METHOD THEREOF

CROSS-REFERENCE TO RELATED APPLICATIONS

This application is a National Stage of International Application No. PCT/CN2016/082498, filed on May 18, 2016, which claims priority to Chinese Patent Application No. 201520696084.7, filed on Sep. 9, 2015, both of which are hereby incorporated by reference in their entireties.

BACKGROUND

Technical Field

The present invention relates to the field of sounding devices, and more particularly to a loudspeaker module and a terminal device.

Description of Related Art

Speakers are important acoustic components in electronic devices, which are transducing devices that convert electrical signals into acoustic signals. An existing loudspeaker module comprises a housing and a sounder unit disposed in the housing, the sounder unit dividing an inner cavity of the housing into a front acoustic cavity and a rear acoustic cavity that are isolated from each other. The front acoustic cavity communicates with a sound hole of the loudspeaker module.

The loudspeaker module, in order to adapt to different atmospheric conditions, is usually provided with a pressure relief hole communicating with the rear acoustic cavity and the outside, so as to maintain the air pressure in the rear acoustic cavity and the external air pressure to be equal. In a conventional structure, the rear acoustic cavity communicates with the interior space of a terminal electronic device through the pressure relief hole, and the terminal electronic device communicates with the outside. Therefore, such a structure can realize the communication between the rear acoustic cavity and the outside to achieve air pressure equalization. The current terminal electronic devices, such as cell phones, need to be strictly waterproof. The interior space of such a waterproof terminal is basically completely sealed. If the interior space of the terminal is sealed, it is difficult to ensure complete air pressure equalization between the terminal and the outside. If the pressure relief hole is arranged on the surface of the housing communicating with the rear acoustic cavity, the purpose of communicating with the outside cannot be achieved, and it is difficult to realize air pressure equalization.

In addition, the pressure relief hole is generally designed on the outer surface of the module. On one hand, this affects the appearance of the loudspeaker module, and on the other hand, the sound relief hole is easily blocked or damaged when cooperating with a terminal product (such as a mobile phone, a computer, etc.).

BRIEF SUMMARY

An object of the present invention is to provide a loudspeaker module.

According to one aspect of the present invention, there is provided a loudspeaker module, comprising: a housing and a sounding unit which is arranged in an inner cavity of the housing, wherein the sounding unit divides the inner cavity into a front acoustic cavity and a rear acoustic cavity isolated from each other, and the housing is further provided with a sound hole communicating the front acoustic cavity with the external environment; and the loudspeaker module further comprises an pressure relief channel which communicates the front acoustic cavity with the rear acoustic cavity and is acoustically sealed.

Preferably, the pressure relief channel is arranged on a partition plate for partitioning the front acoustic cavity and the rear acoustic cavity.

Preferably, the sounding unit comprises a vibration diaphragm; and the pressure relief channel is located between the vibration diaphragm and the sound hole.

Preferably, the pressure relief channel comprises a through hole penetrating through the partition plate, and one side of the partition plate is provided with a damping screen covering the through hole.

Preferably, a groove for accommodating the damping screen is further provided on the partition plate at the position of the through hole.

Preferably, the damping screen is arranged on one side of the partition plate adjacent to the front acoustic cavity.

Preferably, one side of the partition plate opposite to the damping screen is further provided with a pressure relief groove communicating with the through hole, the pressure relief groove is distributed along an end surface of the partition plate, and a cover plate covering the through hole and part of the pressure relief groove is also provided for the partition plate.

Preferably, a boss is provided on the partition plate at the position of the through hole, the pressure relief groove is disposed on an end surface of the boss and has its one end connected to the through hole and extending from the through hole to its other end along the end surface of the boss, and the cover plate covers the end face of the boss.

Preferably, a limiting flange extending upwards is respectively arranged on each side of the boss.

Preferably, the housing comprises an upper housing, a middle housing and a lower housing which are sequentially buckled together.

Preferably, the partition plate is arranged on the middle housing.

The loudspeaker module of the present invention is provided with a pressure relief channel which communicates with the front acoustic cavity and the rear acoustic cavity and which is acoustically sealed. The rear acoustic cavity communicates with the front acoustic cavity through the pressure relief channel so that the rear acoustic cavity can realize air pressure equalization through the front acoustic cavity communicating with the outside in order to ensure air pressure equalization between the rear acoustic cavity and the outside, so that it can adapt to different atmospheric conditions. The loudspeaker module of the present invention does not need to separately provide a pressure relief channel at the position of the rear acoustic cavity and can achieve air pressure equalization though the communication between the pressure relief channel and the front acoustic cavity even if the interior space of a terminal device is completely sealed based on the waterproof requirement. Secondly, since the loudspeaker module of the present invention does not need to separately provide a pressure relief hole communicating with the outside at the position of the rear acoustic cavity, the appearance of the whole module is neat and the pressure relief hole will not be damaged or clogged.

According to another aspect of the present invention, there is provided a terminal device, comprising a terminal device housing and a holding cavity surrounded by the terminal device housing, wherein the holding cavity is a sealed space for accommodating a loudspeaker module mentioned above; the front acoustic cavity of the loudspeaker module communicates with the external environment through the sound hole; and the rear acoustic cavity communicates with the external environment through the pressure relief channel and the front acoustic cavity.

In the terminal device of the present invention, since only the sound hole of the front acoustic cavity of the loudspeaker module in the holding cavity communicates with the outside, the rear acoustic cavity eliminates the pressure relief structure in the conventional structure and the loudspeaker module is more independent and therefore more advantageous for the sealing of the terminal device. That is, a substantially completely sealed state within the holding cavity can be realized, thereby optimizing its dust-proof, waterproofing performance and so on, and providing the terminal device with better audio performance.

Further features of the present invention, as well as advantages thereof, will become apparent from the following detailed description of exemplary embodiments of the present invention with reference to the attached drawings.

BRIEF DESCRIPTION OF THE FIGURES

The accompanying drawings, which are incorporated in and constitute a part of the specification, illustrate embodiments of the present invention and, together with the description, serve to explain the principles of the invention.

DETAILED DESCRIPTION OF VARIOUS EMBODIMENTS

Various exemplary embodiments of the present invention will now be described in detail with reference to the accompanying drawings. It should be noted that the relative arrangement of the components and steps, numerical expressions and numerical values set forth in these embodiments do not limit the scope of the present invention unless it is specifically stated otherwise.

The following description of at least one exemplary embodiment is merely illustrative in nature and by no means is to be construed as any limitation on the present invention and its application or use.

The techniques and equipment known to one of ordinary skill in the relevant art may not be discussed in detail, but where appropriate the techniques and equipment should be considered as part of the description.

In all of the examples shown and discussed herein, any specific value should be interpreted as merely illustrative and not as a limitation. Therefore, other examples of the exemplary embodiments may have different values.

It should be noted that like reference numbers and letters designate similar terms in the following figures, and therefore, an item need not be further discussed in subsequent figures as soon as an item is defined in a drawing.

Figure 1:
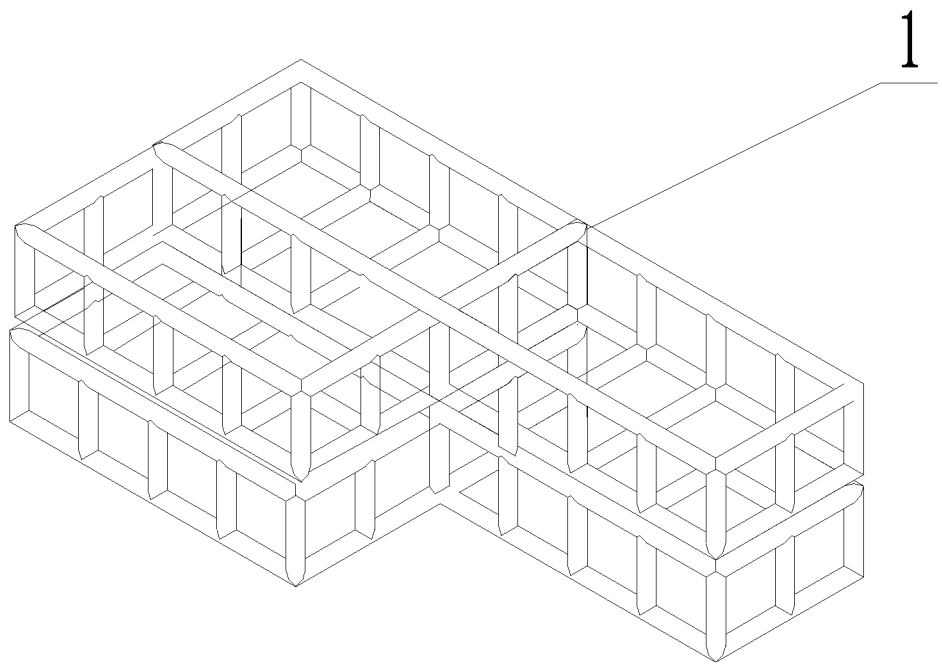
FIG. 1 is a cross-sectional view of a loudspeaker module of the present invention.

Referring to FIG. 1, the present invention provides a loudspeaker module, which comprises a housing and an inner cavity in the housing for accommodating a sounding unit 4. In a specific embodiment of the present invention, the housing comprises an upper housing 3, a middle housing 2 and a lower housing 1 sequentially buckled together. After the upper housing 3, the middle housing 2 and the lower housing 1 are buckled together, the inner cavity for accommodating the sounding unit 4 is formed. The sounding unit 4 divides the internal cavity of the housing into a front acoustic cavity 7 and a rear acoustic cavity 6 isolated from each other. Specifically, a vibration diaphragm of the sounding unit 4 divides the space inside the loudspeaker module into the front acoustic cavity 7 and the rear acoustic cavity 6. The front acoustic cavity 7 is communicated with the external environment by a sound hole 5 of the loudspeaker module, and the rear acoustic cavity 6 is a closed structure. In application, in order to increase the interior space of the loudspeaker module so as to increase the size of the sounding unit and obtain a better sounding effect, steel plates 10 usually replace some positions of the upper housing 3. At the time of forming the upper housing 3, the steel sheet 10 is injection-molded in the manner of an insert. Due to the lightness of the metal material, the steel sheet 10 is thinner than other positions of the upper housing 3, thereby increasing the interior space of the loudspeaker module.

The sounding unit 4 comprises a magnetic circuit system and a vibration system. The magnetic circuit system comprises a basin frame which is arranged in the inner cavity and a magnet which is arranged in the basin frame. A gap is arranged between the magnet and a sidewall of the basin frame. The magnet is also provided with a washer, etc. The vibration system comprises a vibration diaphragm 41 fixed in the inner cavity and a voice coil for driving the vibration diaphragm 41 to sound. The voice coil is fixed on the vibration diaphragm 41 and is suspended in the gap between the magnet and the side wall of the frame. The center of the vibration diaphragm 41 is provided with a dome or the like.

After the voice coil is energized, the voice coil will be vibrated by an ampere force under the action of the magnetic field of the magnetic circuit system. At the same time, the voice coil drives the vibration diaphragm to vibrate together to realize the sounding of the vibration diaphragm. The housing is further provided with a sound hole 5 communicating the front acoustic cavity 7 with the external environment so that the sound emitted by the vibration diaphragm can flow from the sound hole 5 to the outside. The above structure belongs to common general knowledge of a person skilled in the art and will not be described in detail herein.

The loudspeaker module of the present invention further comprises a pressure relief channel 9 that communicates with the front acoustic cavity 7 with the rear acoustic cavity 6 and that is acoustically sealed. The front acoustic cavity 7 can communicate with the rear acoustic cavity 6 through the relief channel 9 so that the rear acoustic cavity 6 can achieve air pressure equalization through the front acoustic cavity 7 communicating with the outside. That is to say, the rear acoustic cavity 6 communicates with the outside through the relief channel 9, the front acoustic cavity 7 and the sound hole 5, so as to keep consistency with the external air pressure.

In the loudspeaker module of the present invention, the pressure relief channel 9 is acoustically sealed. For those skilled in the art, being acoustically sealed means that it is in an acoustically sealed state. That is to say, the sound waves are not allowed to pass through. The pressure relief channel 9 is acoustically sealed. That is, the sound in the front acoustic cavity 7 will not enter the rear acoustic cavity 6 through the pressure relief channel 9, and the sound in the rear acoustic cavity 6 will not pass through the pressure relief channel 9 and enter the front acoustic cavity 7 so as to ensure sound isolation between the front acoustic cavity 7 and the rear acoustic cavity 6 and prevent acoustic short circuits and failure of the loudspeaker module.

In a specific embodiment of the present invention, referring to FIG. 1, a partition plate 8 is provided on the middle housing 2. The sounding unit 4 is fixed on the partition plate 8. The sounding unit 4, together with the partition plate 8, divides the inner cavity of the housing into a front acoustic cavity 7 and a rear acoustic cavity 6. The pressure relief channel 9 is provided on the partition plate 8. Further, the relief channel is located between the vibration diaphragm 41 and the sound hole 5. Of course, for those skilled in the art, the pressure relief channel 9 can be arranged on any part separating the front acoustic cavity 7 and the rear acoustic cavity 6.

The acoustic sealing of the pressure relief channel 9 can be achieved by means well known to those skilled in the art such as by making the pressure relief channel 9 very small or by other known means to increase the damping of the pressure relief channel 9 and making the same as a damping hole structure, so that the sound can be prevented from propagating in the relief channel 9.

Figure 2:
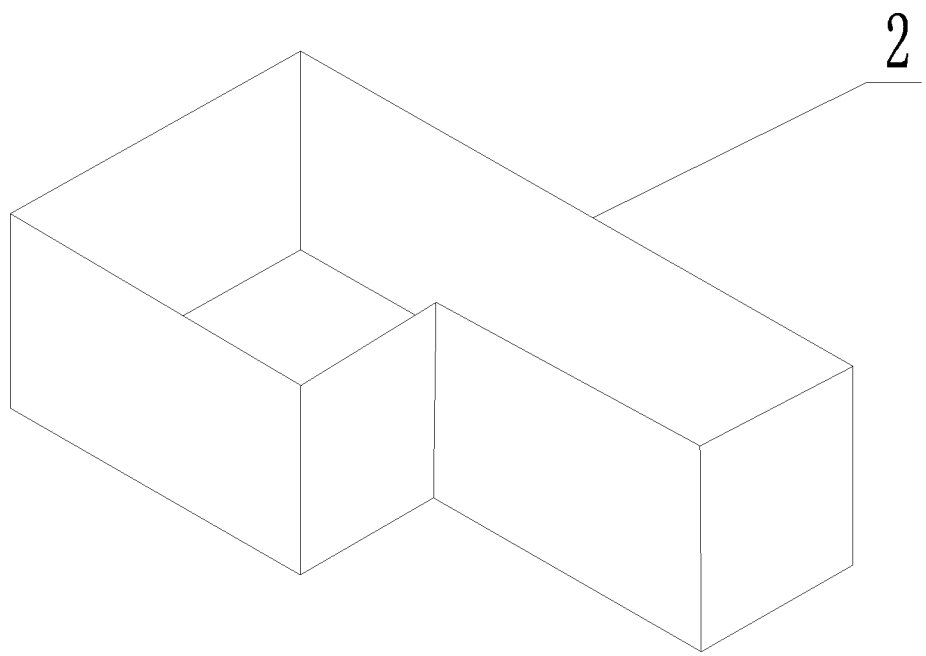
FIG. 2 is a structural diagram of the housing in FIG. 1.
Figure 3:
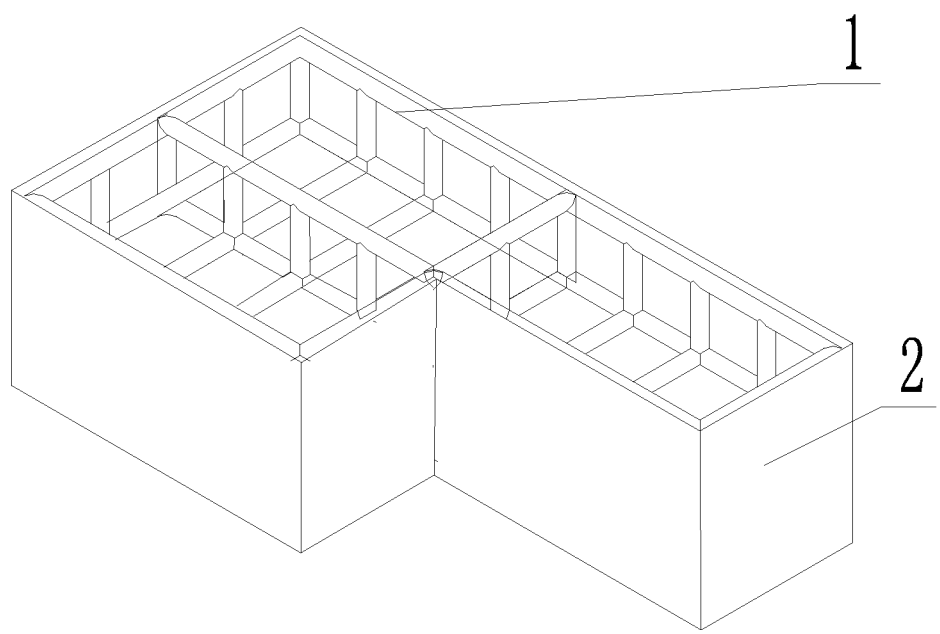
FIG. 3 is a partial enlarged view of the position A in FIG. 2.

In a specific embodiment of the present invention, referring to FIGS. 2 and 3, the pressure relief channel 9 comprises a through hole 13 penetrating the partition plate 8. On one side of the partition plate 8, a damping screen 11 covering the through hole 13 is provided. The damping screen 11 may be provided on one side of the partition plate 8 adjacent to the rear acoustic cavity 6 and preferably on one side of the partition plate 8 adjacent to the front acoustic cavity 7. By means of the damping screen 11, the damping effect of the through hole 13 can be improved so as to realize the acoustic sealing of the front acoustic cavity 7 and the rear acoustic cavity 6.

Of course, for those skilled in the art, adjusting the pitch of the mesh holes in the damping screen 11 can achieve the purpose of adjusting its damping. In the present invention, the damping screen 11 is also arranged to prevent foreign matter from entering the rear acoustic cavity 6.

The damping screen 11 according to the present invention can be fastened to the partition plate 8, for example attached to the partition plate 8, by means well-known to those skilled in the art. Further preferably, a groove 14 is further disposed on the partition plate 8 at the position of the through hole 12. The shape of the groove 14 is matched with the outer contour of the damping screen 11. The damping screen 11 can be attached to the groove 14 to achieve a secure connection of the damping screen 11 to the partition plate 8.

Figure 4:
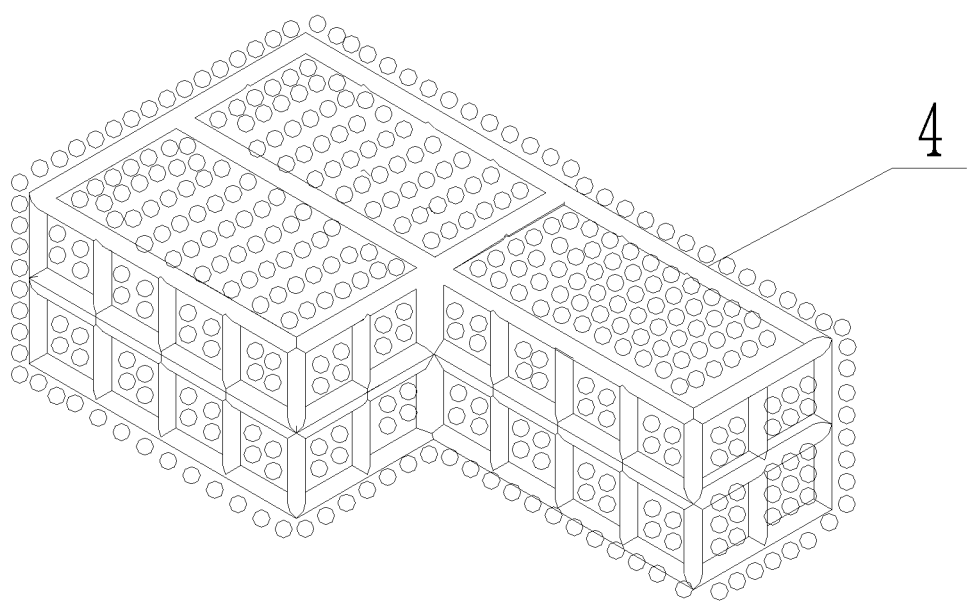
FIG. 4 is a schematic structural view of the other side of the housing in FIG. 2.
Figure 5:
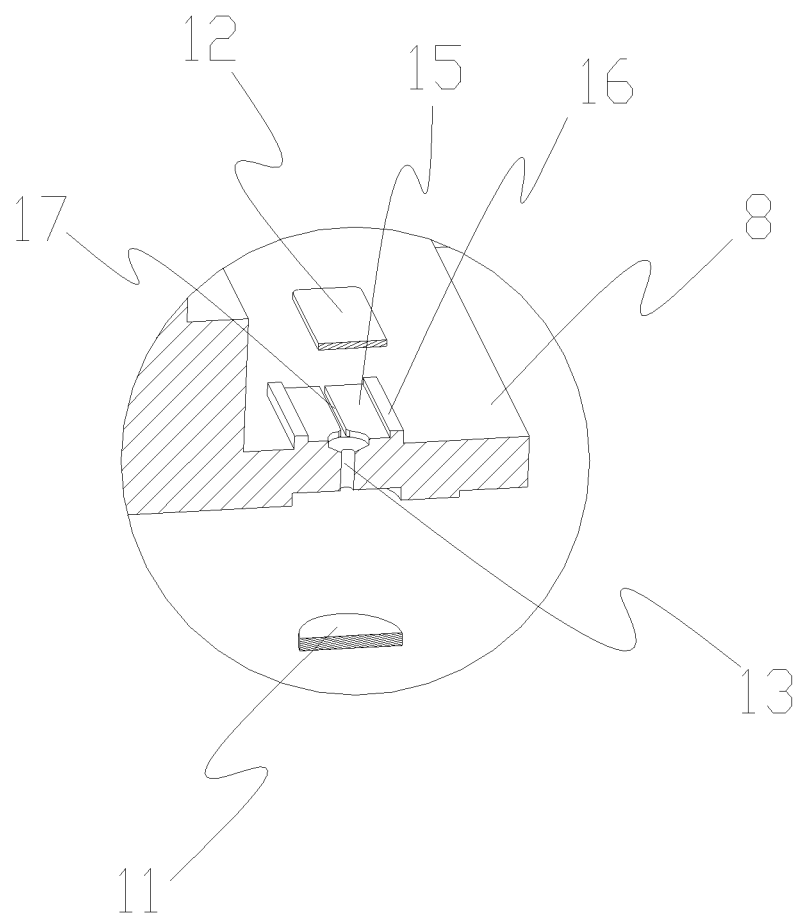
FIG. 5 is a partial enlarged view of the position B in FIG. 4.

In another embodiment of the present invention, a pressure relief groove 17 communicating with the through hole 13 is also provided on a side of the partition plate 8 opposite to the damping screen 11, referring to FIGS. 4 and 5. The pressure relief groove 17 is provided on an end face of the partition plate 8. That is, one end of the pressure relief groove 17 communicates with the through hole 13, and the other end thereof extends along the end face of the partition plate 8. A cover plate 12 that covers the through hole 13 and part of the pressure relief groove 17 is further provided on the end surface of the partition plate 8. The cover plate 12 may be a plastic plate that is fixed to the partition plate 8 and covers the through hole 13 and part of the pressure relief groove 17 so that the through hole 13, the pressure relief groove 17 and the cover plate 12 form the pressure relief channel 9 described above. The pressure relief grooves 17 are distributed on the end face of the partition plate 8, so as to increase the length of the pressure relief channel 9 and improve the damping effect of the pressure relief channel 9.

Preferably, as shown in FIGS. 4 and 5, a boss 15 is disposed on the partition plate 8 at the position of the through hole 13. The pressure relief groove 17 is disposed on an end surface of the boss 15, one end of which is connected to the through hole 13 and extends straight along the end surface of the boss 15 from the through hole 13 so that the other end projects from the end of the boss 15. The cover plate 12 covers the end surface of the boss 15, thereby blocking the through-hole 13 and the pressure relief groove 17. Of course, only one preferred embodiment is shown in the figures. In a specific implementation, the design of the pressure relief groove 17 is not limited to such a structure. For example, one end of the pressure relief groove 17 is connected to the through hole 13 and extends to the other end thereof from the through hole 13 along the end surface of the boss 15, which specifically can bend and extend along the end surface of the boss 15. In this embodiment, the other end of the pressure relief groove 17 does not exceed the end of the boss 15. It can be easily understood that in this case, the cover plate 12 cannot completely block the pressure relief groove 17. The pressure relief groove 17 extends on the end surface of the boss 15 so that the pressure relief groove 17 can be made long enough to increase the damping of the entire pressure relief channel 9 and thus achieve acoustic sealing of the front acoustic cavity 7 and the rear acoustic cavity 6. Further preferably, both sides of the boss 15 are respectively provided with an upward limiting flange 16, so as to limit the cover 12.

The loudspeaker module of the present invention is provided with a pressure relief channel communicating with the front acoustic cavity and the rear acoustic cavity. The pressure relief channel is acoustically sealed so that the sound in the front acoustic cavity will not propagate into the rear acoustic cavity. The rear acoustic cavity communicates with the front acoustic cavity through the pressure relief channel so that the rear acoustic cavity can realize air pressure equalization through the front acoustic cavity communicating with the outside to ensure air pressure equalization between the rear acoustic cavity and the outside. In the loudspeaker module of the present invention, the pressure relief channel 9 is disposed on the partition plate 8 located in the interior space of the loudspeaker module. Because the front acoustic cavity directly communicates with the outside, the pressure relief channel 9 can communicate with the outside by communicating with the front acoustic cavity and thus can be applied to a waterproof electronic device with an almost sealed interior space. In addition, this kind of design does not need to separately provide a pressure relief hole structure for communicating with the outside at the position of the rear acoustic cavity, so that the whole loudspeaker module looks neat and clean and there will be no pressure relief hole damage or blockage problems.

Figure 6:
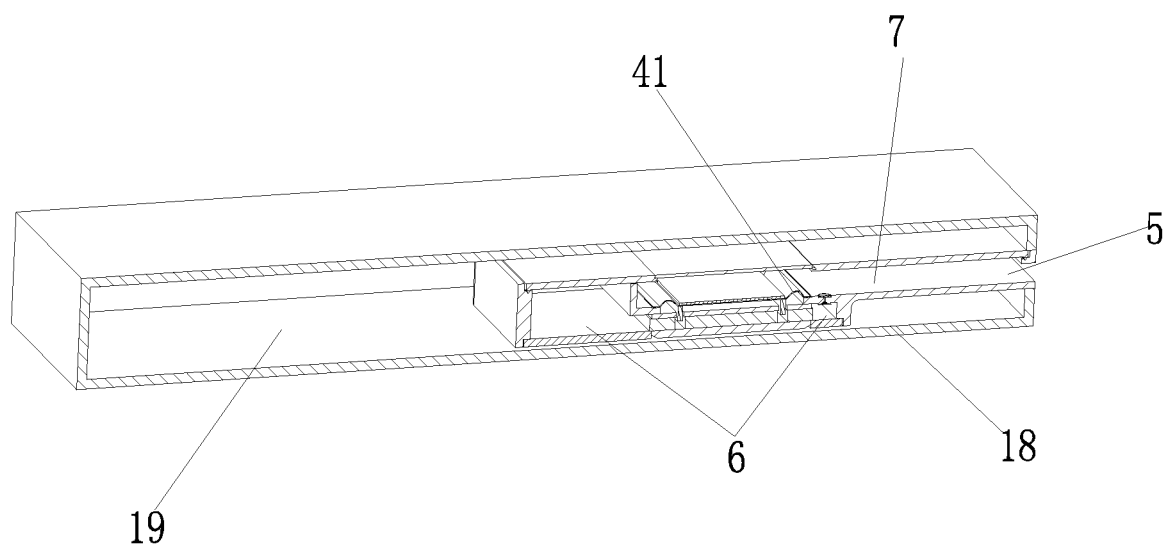
FIG. 6 is a schematic diagram of the loudspeaker module of the present invention applied to a terminal device.

FIG. 6 shows a structure of the above loudspeaker module applied to a terminal device including a terminal device housing 18 and a holding cavity 19 surrounded by the terminal device housing 18. In the present invention, the holding cavity of the terminal device 19 is a substantially completely sealed space based on waterproof needs. The loudspeaker module is accommodated in the holding cavity 19. It can be seen that in this structure, the front acoustic cavity 7 of the loudspeaker module communicates with the outside through the sound hole 5. The rear acoustic cavity 6 and the holding cavity 19 of the terminal device are two independent cavities, which communicate with the front acoustic cavity 7 mainly through the pressure relief channel 9 and communicate with the external environment through the front acoustic cavity 7 so as to achieve air pressure equalization. At this point, the terminal device can be optimal in waterproof effects.

Although some specific embodiments of the present invention have been described in detail by way of example, those skilled in the art should understand that the above examples are only for the purpose of illustration and are not intended to limit the scope of the present invention. It will be understood by those skilled in the art that the above embodiments may be modified without departing from the scope and spirit of the invention. The scope of the invention is defined by the appended claims.

What is claimed is:

1. A sound absorption material preparation method, comprising the following steps:
    S1, preparing a non-foamed material slurry, and mixing the slurry uniformly;
    S2, producing a combustible material framework and a cover-shaped container according to a set structure, and placing the combustible material framework in the cover-shaped container;
    S3, forming the non-foamed material slurry in the cover-shaped container to form a wet formed body, and separating the wet formed body from the cover-shaped container;
    S4, drying the wet formed body to form a dry formed body; and
    S5, calcining the dried formed body, wherein the combustible material framework is burned off during the calcining step to form connected channels with a three-dimensional structure in the sound absorption material, wherein:
        the connected channels with the three-dimensional structure corresponds to the combustible material framework,
        the connected channels with the three-dimensional structure and the combustible material framework have the set structure, and
        the connected channels with the three-dimensional structure is formed to propagate a sound air flow.

2. The preparation method of claim 1, wherein the non-foamed material slurry comprises a non-foamed powder material, a binder and a pore-forming agent.

3. The preparation method of claim 2, wherein the non-foamed powder material is one or more of natural zeolite powder, white carbon black, activated carbon powder and a molecular sieve.

4. The preparation method of claim 2, wherein the binder is an organic silicone sol binder.

5. The preparation method of claim 1, wherein the combustible material framework adopts an activated carbon fiber material.

6. A sound absorption material made of a non-foamed material and having a set space structure in which connected channels with a three-dimensional structure are formed,
    wherein the connected channels with the three-dimensional structure corresponds to the set space structure,
    wherein the connected channels with the three-dimensional structure has the set space structure, and
    wherein the connected channels with the three-dimensional structure is formed to propagate a sound air flow.

7. The sound absorption material of claim 6, wherein specific surface area and density of the sound absorption material are 150-450 m2/g and 0.3-0.7 g/cm3, respectively.

8. The sound absorption material of claim 6, wherein pores are formed inside the sound absorption material, pore volume being 0.5-1.7 cm3/g and macropore diameter being 0.1-50 μm.

9. A sound absorption material filling method, comprising the following steps:
    SS1, preparing a non-foamed material slurry, and mixing the slurry uniformly;
    SS2, producing a combustible material framework and a cover-shaped container according to a structure of a space to be filled, and placing the combustible material framework in the cover-shaped container;
    SS3, forming the non-foamed material slurry in the cover-shaped container to form a wet formed body, and separating the wet formed body from the cover-shaped container;
    SS4, drying the wet formed body to form a dry formed body;
    SS5, calcining the dried formed body to obtain a sound absorption material block capable of filling the space, wherein the combustible material framework is burned off during the calcining step to form connected channels with a three-dimensional structure in the sound absorption material block; and
    SS6, filling the sound absorption material block into the space to be filled,
    wherein:
        the connected channels with the three-dimensional structure corresponds to the combustible material framework,
        the connected channels with the three-dimensional structure and the combustible material framework have the structure, and
        the connected channels with the three-dimensional structure is formed to propagate a sound air flow.

* * * * *